June 30, 1970     D. F. LOMBARDO     3,518,434
X-RAY TUBE ROTATABLE ANODE CONTROL CIRCUIT WITH
MEANS TO SENSE AND CONTROL ANODE MOTOR CURRENT
Filed March 13, 1968     2 Sheets-Sheet 1

INVENTOR.
DANIEL F. LOMBARDO
BY
Watts, Hoffmann, Fisher & Heinke
ATTORNEYS.

June 30, 1970  D. F. LOMBARDO  3,518,434
X-RAY TUBE ROTATABLE ANODE CONTROL CIRCUIT WITH
MEANS TO SENSE AND CONTROL ANODE MOTOR CURRENT
Filed March 13, 1968  2 Sheets-Sheet 2

INVENTOR.
DANIEL F. LOMBARDO
BY
Watts, Hoffmann, Fisher & Heinke
ATTORNEYS.

United States Patent Office 3,518,434
Patented June 30, 1970

3,518,434
X-RAY TUBE ROTATABLE ANODE CONTROL CIRCUIT WITH MEANS TO SENSE AND CONTROL ANODE MOTOR CURRENT
Daniel F. Lombardo, Cleveland, Ohio, assignor to Picker Corporation, White Plains, N.Y., a corporation of New York
Filed Mar. 13, 1968, Ser. No. 712,837
Int. Cl. H05g *1/36;* H01j *35/10*
U.S. Cl. 250—93
25 Claims

ABSTRACT OF THE DISCLOSURE

In a system having an X-ray tube with a rotatable anode, an alternating current motor drives a rotor that rotates the anode. Current through the motor is monitored and used to control provision of an enable-exposure signal at a predetermined time after proper energization of the motor to permit an X-ray exposure to be made, and to terminate that signal if the motor energization is interrupted. The voltage supplied to the motor is reduced as the motor comes up to speed, and is then regulated at a predetermined level. When a motor-energizing signal is removed and then reapplied at a slightly later time, such as might occur when taking a relatively rapid sequence of X-ray exposures, the restarting voltage applied to the motor is reduced from full voltage as a function of the delay in reapplying the motor-energizing signal.

BACKGROUND OF THE INVENTION

Field of the invention

This invention relates to X-ray apparatus embodying an X-ray source having a rotatable anode, and, more particularly, to control circuitry for controlling rotation of such an anode.

Discussion of the prior art

X-ray tubes having rotatable anodes are known in the art. Such tubes have an advantage over a tube having a fixed anode, in that a rotating anode presents a constantly changing target area so that generated heat is dissipated. This heat dissipation permits high energy levels to be used resulting in increased X-ray output as compared with a fixed anode tube.

It is also known in the art to provide means for delaying the X-ray exposure until the rotatable anode of such a tube has come up to its proper rotational speed. Various systems have been devised embodying fixed time delays between initiation of anode rotation and start of an X-ray exposure. However, if rotation of the anode is interrupted, as by faliure of its drive motor or lack of energization of the motor, no indicating or disabling signal is provided to the exposure control means. Generally, in rotatable anode X-ray systems, a constant voltage is applied to the means for rotating the anode. The same voltage is applied whether rotation of the anode is just starting or whether it is rotating at full speed. It is well known that when rotating means, such as a motor, is rotating at its rated speed it requires less input voltage (and hence less power) to maintain rotation at that speed than it requires to come up to speed. Thus, such a system is wasteful of power, and reduces the amount of available power for energizing the X-ray tube itself.

Accordingly, it is a general object of the present invention to provide control circuitry for a motor that rotates an anode in an X-ray tube, which circuitry reduces the voltage provided to the motor in a gradual manner as the motor comes up to its desired rotational speed, and then regulates that voltage supplied to the motor against possible changes in line voltage.

It is another object to provide such motor control circuitry which, when the motor is re-energized after only a short period of de-energization, reduces the voltage applied to the motor from its full starting level as a function of the duration of the de-energization period.

It is a further object to provide control circuitry wherein current through a motor driving a rotatable anode of an X-ray tube is monitored, and an enabling signal provided to permit energization of the X-ray tube only when the motor is energized.

SUMMARY OF THE INVENTION

An alternating current (A.C.) motor rotates an X-ray tube anode. After a "start" signal is applied to the circuit, currents through two stator windings of the motor are monitored. If currents are flowing through both windings properly, an output gate is opened after a short predetermined time delay to provide an enable-exposure signal (or to terminate an inhibit-exposure signal) to X-ray exposure control circuitry.

A 120-cycle per second ramp voltage signal is generated, and compared in a differential amplifier or comparator with a voltage across a capacitor, the latter voltage starting to build up exponentially at the start of the enable-exposure signal. The differential amplifier output provides phase control of a voltage gate that supplies energizing voltage to the A.C. motor for a variable portion of each line voltage cycle determined by the voltage across the capacitor. After a predetermined period of operation, the voltage across the capacitor becomes such that voltage is supplied to the motor only during a relatively small portion of each line voltage cycle to maintain its rotational speed constant.

If the "start" signal to the circuit is terminated, the capacitor discharges slowly. Therefore, if the "start" signal is reapplied after a short time (less than approximately 30 seconds), less than full voltage is applied to the motor. The level of voltage applied is a function of the elapsed time between termination of the "start" signal to the circuit and its re-application.

DESCRIPTION OF A PREFERRED EMBODIMENT

Figure 1:
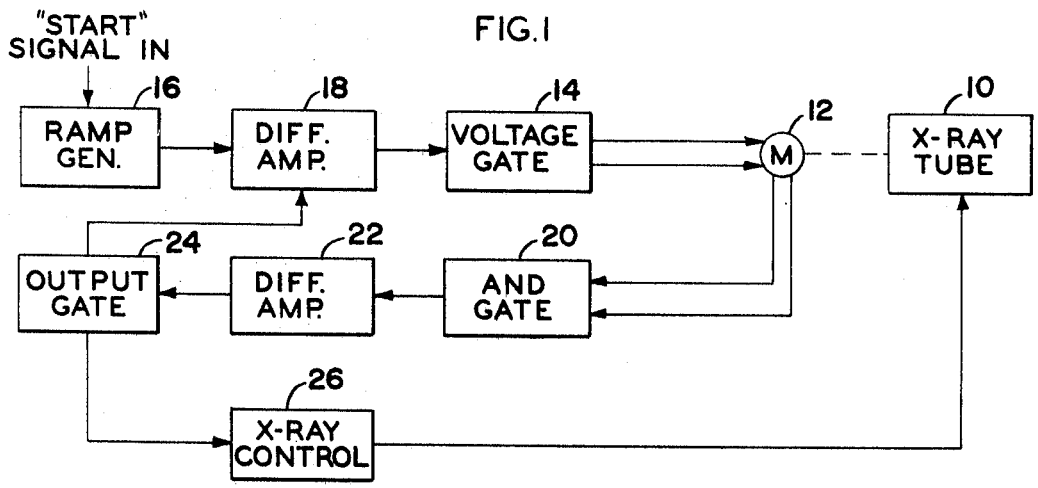
FIG. 1 is a block diagram of control circuitry embodying the invention.

As shown in FIG. 1, an X-ray system embodying the invention comprises an X-ray tube 10 having a rotatable anode (not shown), the rotatable-anode type of X-ray tube being entirely conventional. The anode of the X-ray tube 10 is rotated by means of an alternating-current motor 12. The motor 12 is preferably an unbalanced two-phase motor of so-called permanent-split capacitor type having two stator windings. The two stator windings are energized through a voltage gate 14. The gate 14 permits energization of the motor 12 during variable portions of each half-cycle of A.C. line voltage. Thus, the gate 14 provides a variable average voltage to the motor 12, under control of the remainder of the circuitry.

In order to start rotation of the motor 12, a "start" signal is applied by an operator to a ramp generator 16. The ramp generator 16 then provides a continuous 120-cycle ramp voltage, which is applied to one input of a first differential amplifier or comparator 18. When rotation of the motor 12 is first started, there will be only one input signal to the differential amplifier 18, and its output controls the voltage gate 14 to provide full line voltage to the motor 12. In other words, voltage is applied to the motor 12 throughout substantially all of each half cycle of the incoming 60-cycle line voltage.

Motor operation indicating means comprise monitoring means (not shown in FIG. 1), an AND gate 20, a second differential amplifier or comparator 22, and an output gate 24. Voltage signals are provided by the monitoring means that are respectively proportional to current flow through the two stator windings of the two-phase motor 12. These two voltage signals are supplied to two inputs of the AND gate 20. When both signals are supplied to the AND gate 20 from the motor 12, indicating that current is flowing through the motor windings properly, a signal is produced by the AND gate and provided to the second differential amplifier 22. When the signal is received by differential amplifier 22 from the AND gate 20, a capacitor in the second differential amplifier 22 starts charging, and the voltage across the capacitor is compared with a predetermined fixed reference voltage. Approximately one second is required for the voltage across the capacitor to build up to that of the predetermined reference voltage, at which time an output signal is provided from the differential amplifier 22 to the output gate 24.

The output gate 24 provides two signals. One signal is provided to X-ray tube exposure control circuitry 26, and indicates to the X-ray control circuitry that the tube anode is rotating and that an X-ray exposure can then be made. The X-ray tube control circuitry 26, which is of conventional well-known design, is thus enabled to provide energizing voltage to the X-ray tube 10. A second signal is provided from the output gate 24 to the first differential amplifier 18. That second signal causes a capacitor in the differential amplifier 18 to start charging. As that capacitor charges, the voltage across it is compared with the ramp voltages provided from the ramp generator 16. Output signals are provided from the differential amplifier 18 to the voltage gate 14 as gating signals that vary in time of occurrence as a function of the times at which the 120-cycle ramp voltages exceed the voltage built up across the capacitor in the differential amplifier 18. Thus, the differential amplifier provides phase control of the gate 14 to vary the phase angle at which the A.C. line voltage is applied to the motor. As the charge across the capacitor builds up, the signals provided from the differential amplifier 18 occur at later and later times in each line voltage half-cycle until a predetermined phase angle is reached. After that, the time of occurrence of the signal in each line voltage half-cycle will vary only in response to possible variations in the line voltage so long as the "start" signal is applied to the ramp generator 16.

If the "start" signal is removed from the input of the ramp generator 16, the ramp voltage output of the generator ceases. The voltage across the capacitor in the differential amplifier 18 is thus always larger than the zero input from the ramp generator 16, and the output from the differential amplifier 18 maintains the voltage gate 14 in a continuously open or nonconductive state.

When the "start" signal is removed from the input of the ramp generator 16, the capacitor in the differential amplifier 18 starts to discharge slowly. That discharge is completed in approximately 30 seconds. If the "start" signal is reapplied to the ramp generator 16 before the expiration of the capacitor discharge period, the output signals of the differential amplifier 18 to the voltage gate 14 are such that less than full line voltage is applied to the motor 12. This feature is important, because the anode of the X-ray tube 10 will slow down gradually when the motor 12 is de-energized. Thus, if the system is energized again before rotation of the anode has stopped, less than full voltage is required to bring the anode back up to its normal rotational speed. This reduces the power required to rotate the X-ray tube anode, and results in permitting more X-ray power to be applied to energize the tube itself during a given time period.

Figure 2:
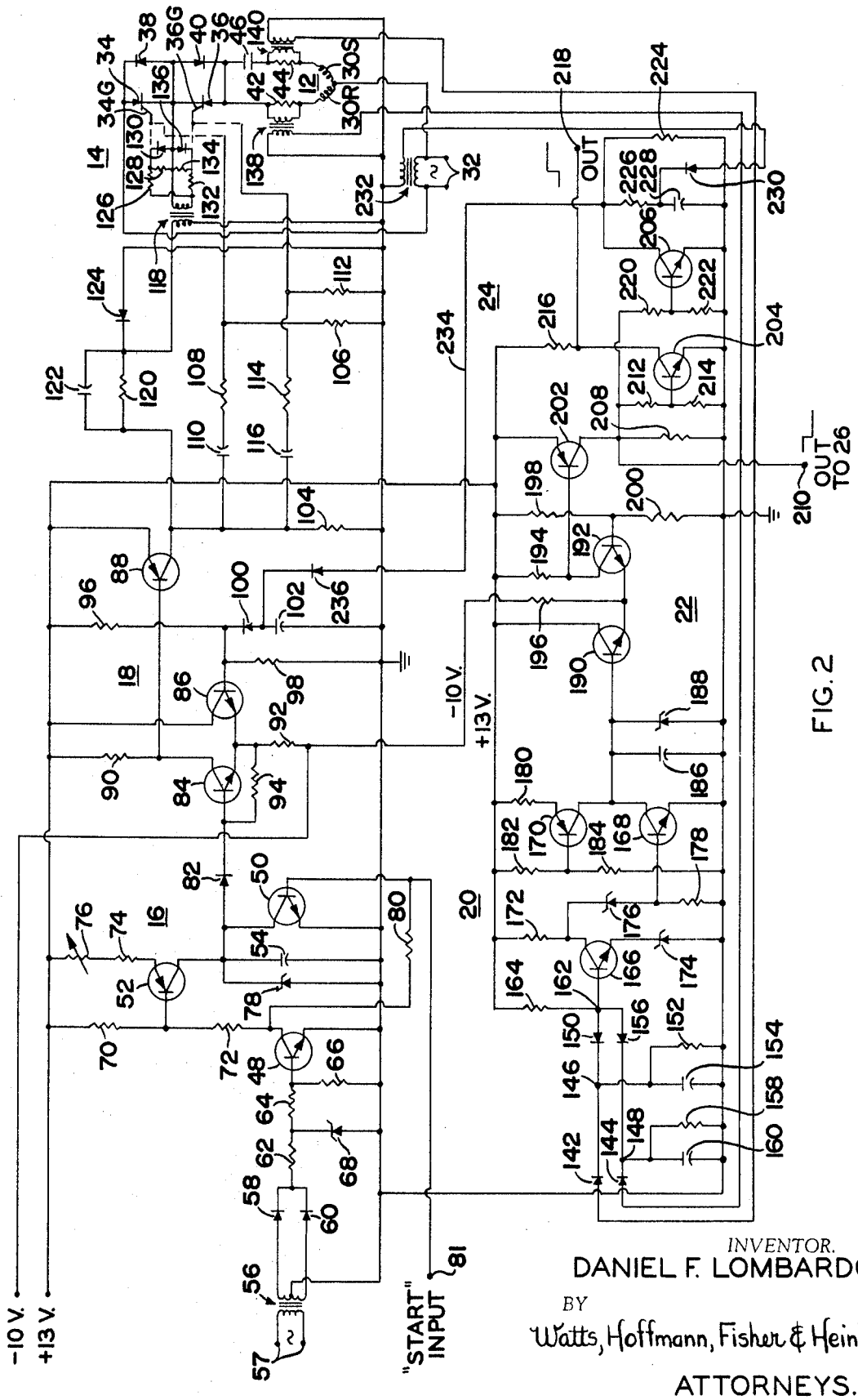
FIG. 2 is a schematic diagram of the embodiment shown in block form in FIG. 1.

The motor 12 shown in block form in FIG. 1 is shown schematically in FIG. 2 as having a "run" stator winding 30R and a "start" stator winding 30S. Power to run the motor 12 is provided from a conventional 60-cycle, 110 volt source (not shown) connected to input terminals 32. One of the input terminals 32 is connected to one end of each of the motor windings 30R, 30S. The other input terminal 32 is connected to the voltage gate 14, which comprises two silicon controlled rectifiers (SCR's) 34, 36 and two diodes 38, 40. The cathodes of the SCR's 34, 36 are connected together and to the anodes of the diodes 38, 40. The cathode of the diode 38 is connected to the anode of the SCR 34 and both are connected to the second input terminal 32. The anode of the SCR 36 is connected to the cathode of the diode 40 and both are connected to energize the motor windings 30R, 30S. A second end of the run winding 30R is connected to the anode of the SCR 36 and the cathode of the diode 40 through a small resistor 42, and a second end of the start winding 30S is similarly connected through a small resistor 44 and a capacitor 46, the latter two being connected in series. The capacitor 46 insures that the currents through the two windings 30R, 30S will be out-of-phase to provide the rotating field required by the motor.

As previously mentioned, the motor 12 is an unbalanced, two-phase motor of the permanent-split capacitor type. Such a motor provides a relatively small starting torque compared with that of a capacitor-start motor, but uses a much smaller capacitor in series with the start winding than does the capacitor-start motor. Therefore, its use is preferred although the invention is not limited to the use of any particular type of alternating-current motor. Assuming for the moment that the SCR's 34, 36 act merely as closed switches, during one-half cycle of the line voltage current will flow through the motor windings, the SCR 34, and the diode 40. During the next succeeding half-cycle of line voltage, current will flow through the motor windings, the SCR 36, and the diode 38.

The SCR's 34, 36 are respectively provided with gate electrodes 34G, 36G. As is well-known, an SCR is a semi-conductor device that normally acts as an open circuit, but switches rapidly to a unidirectionally conducting state when an appropriate gate signal is applied to its gate electrode. In the present case, the SCR's 34, 36 act as open circuits until positive signals are applied to their gate electrodes. The time of application of such positive gating signals during each half-cycle of line voltage determines when each SCR becomes conductive, and hence controls the phase angle at which the 60-cycle line voltage fires the SCR's. In other words, the time of occurrence during each half-cycle of line voltage of the gating signals applied to the gate electrodes 34G, 36G controls the average voltage applied to the stator windings 30R, 30S of the motor 12.

The ramp generator 16, which generates an output voltage having a ramp waveform, comprises two NPN transistors 48, 50 and a PNP transistor 52. The transistor 48 serves as a switching transistor to turn on and off the transistors 50, 52. The transistor 52 acts as a constant current source to charge a capacitor 54. The transistor 50 serves to discharge the capacitor 54 at a 120-cycle rate, and also serves to prevent charging of the capacitor in the absence of a "start" signal applied by an operator.

Looking at specific circuit connections, it is seen that an energizing signal is applied to the base of the transistor 48 from a transformer 56. The transformer 56 has a primary winding that is connected at input terminals 57 to a conventional 60-cycle, 110 volt source (not shown). Opposite ends of a secondary winding of the transformer 56 are respectively connected to anodes of diodes 58, 60, and a center tap of the secondary winding is grounded. The cathodes of the two diodes 58, 60 are connected together and to the base of the transistor 48 through series-connected resistors 62, 64. The base of the transistor 48 is connected to ground through a resistor 66, and a juncture between the resistors 62, 64 is connected to ground through a protective Zener diode 68. The collector of the transistor 48 is connected to a +13 volt direct current supply (not shown) through two load resistors 70, 72, and the transistor emitter is grounded. The base of the constant current charging transistor 52 is connected to a juncture between the resistors 70, 72. The emitter of the transistor 52 is connected to the +13 volt supply through a load comprising a fixed resistor 74 and variable resistor 76. The collector of the transistor 50 is connected to one side of the capacitor 54, the other side of the capacitor 54 being grounded. A Zener diode 78 is connected across the capacitor 54 as a protective device to prevent too high a voltage from accidentally being built up across the capacitor. The collector of the transistor 50 is connected to the collector of the transistor 52, and the emitter of the transistor 50 is grounded. Thus, the transistor 50 is connected directly across the charging capacitor 54. The base of the transistor 50 is connected to the collector of the switching transistor 48 through a resistor 80, and is also connected to an input terminal 81 to which a "start" signal may be applied by an operator. Output from the ramp generator 16 is taken from the collector of the transistor 50 and one side of the capacitor 54 in the form of a 120-cycle linear ramp voltage signal.

In the present instance, the "start" signal applied to the input terminal 81 consists of a ground level signal. In the absence of a "start" signal, the terminal 81 is maintained at a positive potential by conventional external means (not shown). Thus, in the absence of a "start" signal, the base of the transistor 50 is at a positive potential with respect to the transistor emitter, and that transistor will be conducting heavily. Therefore, no voltage can build up across the capacitor 54, and no ramp voltage output signal is provided.

When the input terminal 81 is grounded, indicating the presence of a "start" signal, a ramp voltage output signal is produced by the ramp generator 16. As a result of the rectifying action of the diodes 58, 60, a pulsating direct voltage appears across the input resistor 66, the voltage pulsating at a rate of 120-cycles per second. This means that the base of the transistor 48 will be positive with respect to the transistor emitter during substantially all of each pulsation of the input voltage. It will, however, be at a sufficiently low positive potential for a short time during each pulsation to cut off the transistor 48. When the transistor 48 conducts during substantially all of each input pulsation, the potential at the juncture of the resistors 70, 72 falls below the potential of the emitter of the transistor 52, thus causing that transistor to conduct. The transistor 52 is connected as an emitter follower, so that when it conducts the capacitor 54 is linearly charged by a constant current. The voltage existing across the capacitor 54 is transferred through a diode 82 to one input of the first differential amplifier 18. When the transistor 48 is cut off by the voltage on its base approaching zero, which occurs for a very short time 120 times per second, the collector of the transistor 48 rises in potential. This potential is connected through the resistor 80 to the base of the transistor 50, thus causing the transistor 50 to conduct heavily each time the transistor 48 is cut off. Simultaneously, the base of the transistor 52 rises, and that transistor is cut off. This discharges the capacitor 54 virtually instantaneously through the transistor 50, so that the capacitor 54 may again be recharged when the transistors 48, 52 again conduct.

The differential amplifier or comparator 18 may be any one of various known devices. For example, it may comprise a Schmitt trigger circuit, or an integrated circuit such as Model μA710 or μA710C, manufactured and sold by Fairchild Semiconductor Division of Fairchild Camera and Instrument Corporation, Mountain View, Calif. It serves to compare the amplitudes of the ramp voltage signal from the generator 16 with a reference signal and provide an output signal when the ramp amplitude exceeds the reference amplitude. A representative circuit is illustrated as comprising a pair of NPN transistors 84, 86 and a PNP coupling transistor 88. The base of the transistor 84 is connected directly to the cathode of the diode 82 to receive the positive-going ramp voltage signal from the ramp generator 16. The collector of the transistor 84 is connected to the +13 volt supply through a load resistor 90, and the emitter of the transistor is connected through a resistor 92 to a −10 volt direct-current supply (not shown). The base and the emitter of the transistor 84 are also connected together through a resistor 94.

The transistor 86, which cooperates with the transistor 84 to provide a voltage comparison function, has its collector connected directly to the +13 volt supply and its emitter connected to the emitter of the transistor 84. The base of the transistor 86 is connected to a juncture of two resistors 96, 98 connected in series as a voltage divider between the +13 volt supply and ground. This provides a positive bias on the base of the NPN transistor 86, so that in the absence of an input signal from the ramp generator 16 that transistor is normally conducting. When the transistor 86 is conducting, it maintains the emitter of the transistor 84 at a positive potential relative to the base of that transistor, so that the transistor 84 is non-conducting. The base of the transistor 86 is also connected to ground through a diode 100 and a capacitor 102 connected in series. The diode is so poled that current does not flow from the +13 volt supply through the resistor 96 to charge the capacitor 102. A juncture between the diode 100 and the capacitor 102 is connected to receive a positive signal from the output gate 24, which will be later described.

The base of the coupling transistor 88 is connected directly to the collector of the transistor 84. The emitter of the transistor 88 is connected directly to the +13 volt supply, and the collector of that transistor is connected to ground through a load resistor 104. Output signals from the differential amplifier 18 are taken from the collector of the transistor 88. Inasmuch as the transistor 84 is normally in a non-conducting state, its collector and the base and emitter of the transistor 88 will be at the same potential, and the transistor 88 will be non-conductive. Therefore, its collector will be at approximately ground potential, which is taken to mean that it provides no output signal.

To aid in understanding the operation of the differential amplifiers 18, assume that there is no positive input signal from the output gate 24, and that the base of the transistor 86 is biased just sufficiently positive to maintain that transistor in a conductive state. The transistor 84 is thus maintained in a non-conductive condition. If now a positive-going ramp voltage signal is received from the ramp generator 16 through the diode 82, the base of the transistor 84 will be driven positive with respect to its emitter. This causes the transistor 84 to conduct, which lowers its collector potential and raises its emitter potential. The rise in potential of the emitter of the transistor 84 causes the transistor 86 to become non-conductive. The drop in potential of the collector of the transistor 84 causes the coupling transistor 88 to become conductive, thus providing a positive output signal on the collector of that transistor. The positive signal will be present on the collector of the transistor 88 until termination of the ramp voltage input signal to the base of the transistor 84 from the ramp generator 16.

Gating signals may be provided from the coupling transistor 88 to the voltage gate 14 in either of two ways, the way chosen depending on the connections of the power source to the gate 14 and the motor 12. If the voltage gate and the motor are isolated from the 60-cycle line, as by being connected across a secondary winding of a transformer, gating signals may be supplied directly to the gate electrodes 34G, 36G of the SCR's 34, 36. In that case, a gating signal may be supplied to the gate electrode 34G from across a resistor 106, which is connected in series with a resistor 108 and a capacitor 110 between the collector of the transistor 88 and ground. Similarly, a gating signal may be supplied directly to the gate electrode 36G from across a resistor 112 connected in series with a resistor 114 and a capacitor 116 between the collector of the transistor 88 and ground. Thus, positive gating signals are supplied directly from the coupling transistor 88 to the gate electrodes of the SCR's 34, 36.

In the present case, however, the voltage gate 14 and the motor 12 are shown as connected directly across the 60-cycle supply line at the input terminals 32. Therefore, it is necessary to isolate the coupling transistor 88 from the voltage gate 14. This isolation is performed by a pulse transformer 118. The pulse transformer 118 has a primary winding connected in series with a resistor 120 between the collector of the transistor 88 and ground. A capacitor 122 is connected across the resistor 120, and a diode 124 is connected across a primary of the pulse transformer 118 to short circuit any transient voltages developed.

A secondary winding of the pulse transformer 118 has one end connected to the juncture of the cathodes of the SCR's 34 and 36. A first voltage divider comprising two series-connected resistors 126, 128 is connected across the secondary winding of the transformer, and the gate electrode 34G of the SCR 34 is connected to the juncture of those two resistors. A diode 130 connected across the resistor 128 prevents any transient signals from being applied to the gate electrode 34G that are negative with respect to the cathode of the SCR 34. A second voltage divider comprising two series-connected resistors 132, 134 is connected across the transformer secondary winding in parallel with the first voltage divider. The gate electrode 36G of the SCR 36 is connected to the juncture of the resistors 132, 134. A diode 136 connected across the resistor 134 performs the same function for the SCR 36 as does the diode 130 for the SCR 34.

The pulse transformer 118 primary and secondary windings are so arranged that a positive pulse applied to the primary winding will produce positive pulses across the resistors 128, 134 connected across the secondary winding. These pulses are applied to the gate electrodes 34G, 36G, respectively. A positive pulse applied to the gate electrode of an SCR will cause the SCR to break down and conduct current, if the anode of the SCR is positive with respect to the cathode. In the present case, a potential difference of the proper polarity exists across the SCR's 34, 36 alternately, the two SCR's being capable of conducting alternately. In other words, during one-half cycle of the 60-cycle input voltage one of the SCR's will conduct and during the next half-cycle the other SCR will conduct, assuming that positive gate voltages are applied to the gate electrodes 34G, 36G while the anodes of the SCR's are positive with respect to their cathodes. Thus, by varying the time in each half-cycle at which a positive gating signal is applied to the gate electrodes 34G, 36G, the average voltage applied to the motor 12 can be varied. This provides what is referred to herein as phase control of the voltage gate 14. The time in each half-cycle of alternating voltage applied to the voltage gate 14 at which positive gating pulses are applied to the SCR's is controlled by the remainder of the circuitry to be described.

The monitoring means included in the motor operation indicating means previously mentioned comprises the small resistor 42 connected in series with the winding 30R of the motor 12, and the similar resistor 44 connected in series with the winding 30S. A primary winding of a transformer 138 is connected across the resistor 42, and a primary winding of a transformer 140 is connected across the resistor 44. Alternating current through the motor windings 30R, 30S induces alternating current signals in secondary windings of the transformers 138, 140. One end of each of the secondary windings of the transformers 138, 140 is grounded and the other end is connected to an input of the AND gate 20 previously mentioned with reference to FIG. 1.

The ungrounded ends of the secondary windings of the transformers 140, 138 are respectively connected to the anodes of a pair of diodes 142, 144 in the AND gate 20. The cathodes of the diodes 142, 144 are respectively connected to juncture points 146, 148. The juncture point 146 is connected to the cathode of a diode 150, and to ground through a parallel combination of a resistor 152 and a capacitor 154. The juncture point 148 is similarly connected to the cathode of a diode 156 and to ground through a parallel combination of a resistor 158 and a capacitor 160. The anodes of the diodes 150, 156 are connected together and to a juncture point 162, which point is also connected to the +13 volt supply through a resistor 164.

The AND gate 20 includes two NPN transistors 166, 168 and a PNP transistor 170. The base of the transistor 166 is connected to the juncture point 162. In the absence of input signals, the base of the transistor 166 is maintained at a slight positive potential because of current flow through the resistor 164, the diodes 150, 156, and the resistors 152, 158. The collector of the transistor 166 is connected through a load resistor 172 to the +13 volt supply, and the emitter of that transistor is connected to ground through a Zener diode 174. Even though the base of the transistor 166 is normally slightly positive, the transistor is maintained in a non-conductive state because of the Zener diode connecting the transistor emitter to ground, which maintains the emitter at a higher positive potential than the base. The collector of the transistor 166 is also connected to ground through a Zener diode 176 and a resistor 178 connected in series. The base of the transistor 168 is connected to a juncture of the anode of the Zener diode 176 and the resistor 178. The emitter of the transistor 168 is connected directly to ground, and its collector is connected directly to the collector of the transistor 170. The emitter of the transistor 170 is connected to the +13 volt supply through a load resistor 180. The base of the transistor 170 is maintained at a constant positive bias by being connected to a juncture between two resistors 182, 184 connected in series between the +13 volt supply and ground. Thus, the transistor 170 acts as a constant current source. A capacitor 186 and a Zener diode 188 are connected in parallel between the collector and emitter of the transistor 168.

As previously mentioned, the transistor 166 is non-conductive in the absence of input signals. This places its collector at a high potential, and current through the resistors 172, 178 and the Zener diode 176 causes the base of the transistor 168 to be positive with respect to that transistors emitter. Thus the transistor 168 is heavily conducting and it provides a virtual short circuit across the capacitor 186. When two input signals are received simultaneously through the diodes 142, 144, it causes sufficient voltage to appear across the resistors 152, 158 to raise the potential of the base of the transistor 166 to a point where that transistor becomes conductive. The collector potential of the transistor 166 drops when that transistor conducts, and current flows through the diode 174 rather than through the series combination of the diode 176 and the resistor 178. This causes the base of the transistor 168 to drop in potential and causes that transistor to become non-conductive. Current then flows through the transistor 170 and through the capacitor 186 to charge the capacitor 186. The charging time constant of the capacitor 186 is such that it is fully charged in approximately one second. The final voltage permitted across the capacitor 186 is defined by the breakdown potential of the Zener diode 188. It is particularly pointed out that current must flow through both of the motor windings 30R, 30S in order to provide the required two input signals to cause the transistor 166 in the AND gate 20 to become conductive. Thus, if a malfunction occurs such that either or both windings of the motor 12 are not energized, the AND gate 20 will not be actuated to permit charging of the capacitor 186.

The second differential amplifier or comparator 22 is similar to the first differential amplifier 18, and comprises a pair of NPN transistors 190, 192. The base of the transistor 190 is connected directly to one side of the capacitor 186 in the AND gate 20 to receive the positive voltage built up across that capacitor. The collector of the transistor 190 is connected directly to the +13 volt supply, and the collector of the transistor 192 is connected to that supply through a load resistor 194. The emitters of the transistors 190, 192 are connected together and to the −10 volt supply through a resistor 196. The base of the transistor 192 is connected to a juncture point between two resistors 198, 200 connected in series between the +13 volt supply and ground.

The purpose of the differential amplifier 22 is to compare the voltage built up across the capacitor 186 with the fixed reference voltage applied to the base of the transistor 192 from the voltage divider formed by the resistors 198, 200. When there is no positive output signal from the AND gate 20, the base of the transistor 190 in the differential amplifier 22 is low and that transistor is in a non-conducting state. The transistor 192, however, is in a conductive state, because its base is positive with respect to its emitter due to its fixed positive bias. Therefore, its collector potential is low. When there is coincidence between two input signals applied to the AND gate 20, the transistor 168 becomes non-conductive, and voltage starts to build up across the capacitor 186. When the voltage across the capacitor 186 becomes sufficiently positive, the transistor 190 becomes conductive, which causes the transistor 192 to become non-conductive. This transition occurs when the voltage across the capacitor 186 exceeds the reference voltage provided to the base of the transistor 192. When the transistor 192 becomes non-conductive, its collector potential rises. The positive-going output signal from the differential amplifier 22 is taken from the collector of the transistor 192.

The positive-going output signal from the differential amplifier 22 resulting from coincidence of two input signals at the AND gate 20 is supplied to the output gate 24. The output gate 24 comprises a PNP resistor 202, and two NPN resistors 204, 206. The output signal from the collector of the transistor 192 in the differential amplifier 22 is connected directly to the base of the transistor 202 in the output gate 24. The emitter of the transistor 202 is connected directly to the +13 volt supply, and the collector of that transistor is connected to ground through a resistor 208. An output signal of one polarity may be taken from across the resistor 208 in the emitter-collector circuit of the transistor 202. Inasmuch as the output signal from the differential amplifier 22 to the output gate 24 is normally low in the absence of coincident input signals to the AND gate 20, the transistor 202 will normally be conductive. Thus, a positive output signal will be present across the resistor 208 and supplied to an output terminal 210. This positive signal may be supplied as an inhibit-exposure signal to the X-ray exposure control circuitry 26 (FIG. 1) to maintain that circuitry in a condition to prevent an X-ray exposure from being made. When two input signals are coincidentally supplied to the AND gate 20, the transistor 192 in the differential amplifier is turned off. This raises the potential of the base of the transistor 202 in the output gate 24, thus causing that transistor to become non-conductive. Therefore, there is no voltage developed across the resistor 208 and the output signal on the terminal 210 goes essentially to ground potential. This may constitute an enable-exposure signal for the X-ray exposure control circuitry 26. As previously noted, this latter signal will be provided approximately one second after the first coincidence of input signals to the AND gate 20.

An inverse enable-exposure signal (inhibit-exposure signal) is provided by the transistor 204. The base of the transistor 204 is connected to an approximate mid-point in a voltage divider comprising two resistors 212, 214 connected across the load resistor 208. The collector of the transistor 204 is connected to the +13 volt supply through a load resistor 216, and the emitter of the transistor is grounded. When the transistor 202 is conducting, a positive bias is provided on the base of the transistor 204 so that that transistor is also conducting. When the transistor 202 is non-conductive, the base and emitter of the transistor 204 are both at essentially ground potential and that transistor is also non-conductive. A second output signal may be supplied to a terminal 218 from the collector of the transistor 204, if desired. That signal supplied to the terminal 218 will be substantially at ground potential when the transistors 202, 204 are conducting, and will rise to approximately +13 volts when the transistors 202 and 204 become non-conductive. Thus, the signal appearing at the output terminal 218 is the inverse of that appearing at the output terminal 210. Depending upon the particular design of the X-ray control circuitry 26, either of the signals appearing at the terminals 210, 218 may be utilized to indicate readiness for the start of an X-ray exposure.

An important function of the output gate 24, in addition to providing inhibit-exposure and enable-exposure signals at the output terminals 210, 218, is to provide a signal to the first differential amplifier 18 to permit charging of the capacitor 102 and cut back the phase of the voltage gate output to the motor 12. It is to this end that the transistor 206 is provided in the output gate 24.

The base of the transistor 206 is connected approximately to a mid-point in a voltage divider comprising resistors 220, 222 connected in series across the resistor 208. The emitter of the transistor 206 is connected directly to ground. The collector of that transistor is also connected to ground through a resistor 224. The collector of the transistor 206 is also connected to ground through a series combination of a resistor 226 and a capacitor 228. Operating potential for the transistor 206 is applied to a juncture point between the resistor 226 and the capacitor 228.

The juncture point between the resistor 226 and the capacitor 228 is connected through a diode rectifier 230 to one end of a secondary winding of transformer 232. The other end of the secondary winding of the transformer is grounded, and a primary winding of the transformer is connected across the 60-cycle line voltage input terminals 32. Thus, a 60-cycle voltage continuously appears across the secondary winding of the transformer 232, which is rectified and applied to the collector of the transistor 206. The output signal from the output gate 24 provided to the first differential amplifier 18 is taken from the collector of the transistor 206 on a lead 234 and is applied through a diode 236 to a juncture between the diode 100 and the capacitor 102 in the differential amplifier 18. When the transistor 206 is conducting, the rectified voltage applied to its collector from the transformer 232 is short circuited to ground, and does not appear on the lead 234. On the other hand, when the transistor 206 is non-conductive, the rectified signal from the transformer 232 is applied by way of the lead 234 and the diode 236 to the capacitor 102 in the first differential amplifier 18. The capacitor 102 slowly charges, which shifts in phase the output of the differential amplifier 18 as previously described to reduce the conduction time of the SCR's 34, 36 in the voltage gate 14 and reduce the voltage applied to the motor 12.

Figure 3:
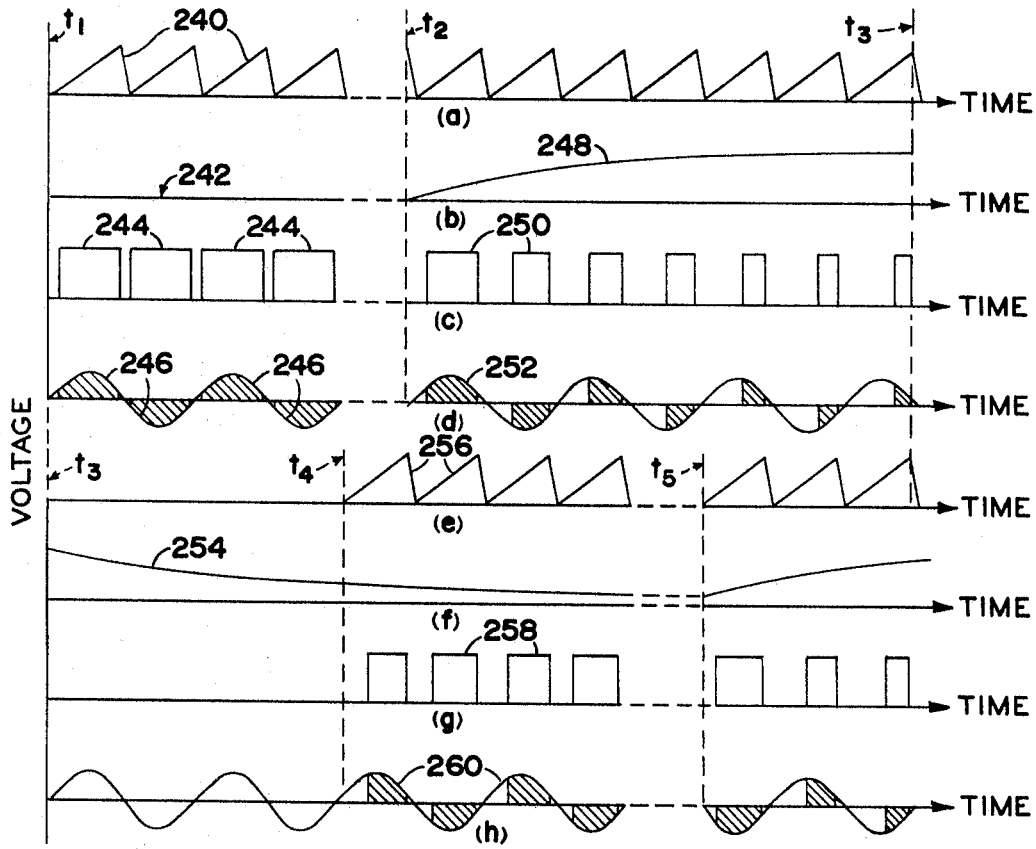
FIG. 3 is a set of waveforms useful in understanding the operation of the circuitry shown in FIGS. 1 and 2.

The operation of the control circuitry embodying the invention can best be understood by reference to the waveforms shown in FIG. 3 taken in conjunction with the schematic diagram of FIG. 2. Assume first that no exposure has been made for a sufficient length of time to permit the circuitry to attain a quiescent condition. In that condition, with no "start" signal applied to the input terminal 81, the transistor 50 in the ramp generator 16 is conducting, and there is no output signal from the ramp generator to the differential amplifier 18. In the differential amplifier 18, the capacitor 102 has discharged through the diode 100 and resistor 98. The transistor 86 is conductive, and the transistor 84 is non-conductive so that its collector and the base of the transistor 88 are at a high potential. Thus, the transistor 88 is non-conductive and no positive output signals are provided across the resistor 104. This means that there are no positive pulse signals being applied through the transformer 118 to gate the SCR's 34, 36 and thus no voltage will be supplied to the windings 30R, 30S, of the motor 12.

Because there is no current through the windings 30R, 30S, there will be no signals supplied from the transformers 138, 140 to the two inputs to the AND gate 20. Thus, the transistor 168 in the AND gate 20 will be conductive, and no charge will be built up across the capacitor 186. In this case, the transistor 190 in the differential amplifier 22 will be non-conductive, while the transistor 192 will be conductive. This, in turn, causes the transistor 202 to conduct and provide a high output signal at the terminal 210. Conduction of the transistor 202 also causes conduction of the transistors 204, 206. Thus, a low output signal is provided at the output terminal 218 from the transistor 204. The transistor 206 provides essentially a short circuit to ground of any voltage appearing across the resistor 226, so that no charging current is present in the lead 234. Thus, the capacitor 102 in the first differential amplifier 18 remains in its uncharged state.

Assume now that at time $t_1$ a start signal is applied by an operator to the input terminal 81 of the circuitry. As previously noted, this operation comprises removing a positive potential from the input terminal 81 and grounding that terminal. This causes conduction and non-conduction of the transistor 50 in the ramp generator 16 to be controlled by the transistor 48 as previously described. The transistor 50 is non-conductive during virtually all of each cycle of the 120-cycle input signal to the ramp generator. The transistor 50 is conductive only during a short period during each cycle to discharge the capacitor 54. Thus, a positive voltage ramp signal 240 is provided to the base of the transistor 84 in the first differential amplifier 18 as shown in FIG. 3(a). This causes the transistor 84 to be conductive during virtually all of each cycle of the 120-cycle input ramp signals, and thus causes the transistor 88 to be similarly conductive. At this time, the capacitor 102 in the differential amplifier 18 has no voltage built up across it, as shown by a zero potential level 242 in FIG. 3(b). As the transistor 88 conducts during virtually all of each ramp voltage cycle, it produces a series of positive output pulses as shown at 244 in FIG. 3(c). It is noted that the output pulses 244 are of substantially uniform width, and equal in duration to the positive-going portions of the ramp voltage signals 240. The pulses 244 are spaced apart in time by amounts corresponding to the discharge time of the capacitor 54 in the ramp generator 16.

The pulses 244 are supplied through the transformer 118 as positive gating pulses to the gate electrodes 34G, 36G of the SCR's 34, 36. This causes the SCR's to be alternately conductive to apply alternating-voltage to the windings 30R, 30S of the motor 12. The SCR's are alternately conductive during virtually all of each half-cycle, and are not conductive only during those very short periods between provision of the pulses 244. Shaded areas under a sine wave curve 246 shown in FIG. 3(d) indicate the periods of conduction of the SCR's 34, 36.

Current through the motor windings 30R, 30S induces alternating current signals in the secondary windings of the transformers 138, 140. These signals are coupled to the inputs of the AND gate 20 and cause the transistor 166 to become conductive. This turns off the transistor 168 which permits the capacitor 186 to start to charge. After approximately one second, the charge across the capacitor 186 will have become sufficient to turn on the transistor 190 and to turn off the transistor 192 in the second differential amplifier 22. When the transistor 192 ceases conducting, its collector goes high, which turns off the transistor 202 in the output gate 24. Thus, current through the resistor 208 ceases and the output terminal 210 goes low. Simultaneously, the bases of both transistors 204, 206 go low, which causes those transistors to become non-conductive. Non-conduction of the transistor 206 permits the rectified voltage from the secondary winding of the transformer 138 to be applied through the lead 234 and the diode 236 to the capacitor 102 in the first differential amplifier 18.

In FIG. 3, a time $t_2$ designates the time at which the charge across the capacitor 186 in the second differential amplifier 22 is such as to cut off the transistor 202. As shown by a curve 248 in FIG. 3(b), the voltage across the capacitor 102 in the first differential amplifier 18 builds up slowly. As the voltage builds up, the transistor 84 becomes conductive at successively later times during successive ramp voltage cycles. This reduces the widths of successive positive output pulses from the transistor 88, as shown by a series of pulses 250 in FIG. 3(c). Eventually, the voltage across the capacitor 102 attains a steady value such that positive output pulses of constant width are produced by the transistor 88. The widths of these pulses are predetermined by the various circuit constants of the differential amplifier 18 to provide approximately 40% of full line voltage to the motor windings 30R, 30S. Shaded areas under a sine wave curve 252 shown in FIG. 3(d) indicate the periods of conduction of the SCR's 34, 36.

If the incoming line voltage applied to the terminal 32 varies, the charging current applied to the capacitor 102 in the differential amplifier 18 from the transformer 232 will vary. This will cause the widths of the gating pulses applied to the SCR's to vary in a manner such as to cause the rotational speed of the motor 12 to be maintained substantially constant. Thus, the control system stabilizes about a point, and varies from that point only in response to removal of the "start" signal from the input terminal 82 or in response to fluctuations in line voltage applied to the system.

When the start signal is removed from the input terminal 81, as at time $t_3$, the transistor 50 in the ramp generator 16 is again turned on and there is no voltage ramp output from the generator to the first differential amplifier 18. The positive output gate pulses from the transistor 88 cease, so that the SCR's 34, 36 do not conduct and power is removed from the motor windings 30R, 30S. This means that input signals are no longer being provided to the AND gate 20, and the transistor 168 in that gate is turned on to discharge the capacitor 186. This causes the transistor 192 in the comparator 22 to become conductive again, as well as the transistor 202 in the output gate 24. This causes a high or inhibit-exposure signal to appear at the output terminal 210. The transistor 204 turns on to provide a low output signal at the terminal 218, and the transistor 206 turns on to prevent the signal appearing on the secondary of the transformer 232 from being applied to the capacitor 102. The capacitor 102 in the first differential amplifier 18 starts to discharge slowly, as shown by a curve 254 in FIG. 3(f), its discharging time constant preferably being substantially longer than its charging time constant (of the order of 4:1).

Assume now that at time $t_4$, after a lapse of perhaps ten seconds after time $t_3$, the "start" signal is again applied to the input terminal 81. This again enables the ramp generator 16, and it produces 120-cycle voltage ramp output signals, as shown by a curve 256 in FIG. 3(e). Positive-going output gating pulses are again provided by the transistor 88 in the first differential amplifier 18, as shown by a set of pulses 258 in FIG. 3(g). The pulses 258 cause the SCR's 34, 36 to be conductive during portions of each half cycle of the 60-cycle line voltage input, as shown by shaded portions in a sine waveform 260 in FIG. 3(h). It is pointed out that at the time $t_4$ there is no output signal from the AND gate 20. Thus, the transistor 168 in the AND gate is conductive and the capacitor 186 is maintained fully discharged. Therefore, the transistors 204, 206 in the output gate 24 will all be conductive. When the SCR's 34, 36 conduct in response to the gate pulses 258, current flows through the motor windings 30R, 30S and output signals are induced in the secondary windings of the transformers 138, 140. Two input signals are thus provided to the AND gate 20, which cuts off the transistor 168 and the capacitor 186 again starts to charge. As in the case previously described, after approximately one second the voltage across the capacitor 186 will be sufficient to cause the transistor 190 to conduct and the transistor 192 to be cut off. This cuts off the transistors 202, 204, 206 in the output gate 24 to provide enable-exposure signals on the output terminals 210, 218 and to permit the capacitor 102 in the differential amplifier 18 to start recharging.

It is pointed out that during the time period from $t_4$ to $t_5$, the capacitor 102 in the differential amplifier 18 has continued to discharge at a relatively slow rate. This means that successive gating pulses 258 have become increasingly wider, and the SCR's 34, 36 have been conductive during increasingly larger portions of each voltage input cycle. At time $t_5$, however, as voltage again starts to build up across the capacitor 102, the widths of successive gating pulses start to decrease, as does the period of conduction of each of the SCR's. After a short time, the circuit will again stabilize at that point previously mentioned where the voltage supplied to the windings 30R, 30S of the motor 12 is approximately 40% of the full line voltage.

It should now be apparent that control circuitry embodying the invention attains the objectives previously set forth. The relatively rapid charging of the capacitor 102 and its relatively slow discharging reduce the voltage applied to the motor in a relatively short time as the motor comes up to its full rotational speed. If the circuitry is turned off for a short period of time, because of the slow discharge rate of the capacitor 102, a reduced voltage is applied to the motor 12 which voltage varies as a function of the time during which the circuit was de-energized. As noted, approximately thirty seconds must elapse between de-energization and energization of the circuitry again before full power is applied to the motor 12. This reduces the overall power required to rotate the anode of the X-ray tube, and thus permits more power to be utilized in providing an X-ray exposure.

Although one embodiment of the invention has been shown and described, it is apparent that many changes and modifications may be made therein by one skilled in the art without departing from the true scope and spirit of the invention.

What is claimed is:

1. In an X-ray system having an X-ray tube with a rotatable anode, an alternating-current motor for rotating the anode, and X-ray tube control means for energizing the X-ray tube, control circuitry comprising:
   (a) voltage gate means for selectively applying voltage to said alternating-current motor thus regulating the amount of power delivered thereto;
   (b) motor operation indicating means responsive to current through said motor for providing a first signal to said X-ray tube control means enabling said control means to energize said tube and providing a second signal;
   (c) generator means for producing a control signal having a cyclically varying magnitude;
   (d) reference signal generating means for receiving said second signal and generating in response thereto a reference signal having a variable magnitude; and
   (e) comparator means for receiving said control signal and said reference signal, comparing their magnitude, and providing a gating signal to said gate means to apply voltage to said motor whenever the magnitude of said control signal exceeds the magnitude of said reference signal.

2. The control circuitry of claim 1, wherein said voltage gate means comprises at least one silicon controlled rectifier to which said gating signal is applied.

3. The control circuitry of claim 1, wherein said control signal is a ramp voltage signal.

4. The control circuitry of claim 1, wherein said motor has two stator windings, and said motor operation indicating means is responsive only to simultaneous current through both said stator windings to provide said first and second signals.

5. The control circuitry of claim 4, wherein said motor operation indicating means comprises an AND gate.

6. The control circuitry of claim 1, wherein said motor operation indicating means includes time delay means for delaying provision of said first and second signals for a predetermined substantially constant time after initiation of current through said motor.

7. The control circuitry of claim 1, wherein said reference signal has an exponential waveform.

8. The control circuitry of claim 1, wherein said reference signal generating means comprises a capacitor whose charge varies to provide said reference signal.

9. The control circuitry of claim 8, wherein said capacitor charges at a first rate during provision of said second signal and discharges at a second rate after termination of said second signal.

10. The control circuitry of claim 9, wherein said second rate is substantially slower than said first rate.

11. The control circuitry of claim 4, wherein said motor operation indicating means comprises an AND gate, and time delay means for delaying provision of said first and second signals for a predetermined substantially constant time after initiation of current through said motor which enables said AND gate.

12. The control circuitry of claim 1, wherein said control signal is a ramp voltage signal and said reference signal has an exponential waveform.

13. The control circuitry of claim 12, wherein said reference signal generating means comprises a capacitor whose charge varies to provide said reference signal.

14. The control circuitry of claim 13, wherein said capacitor charges at a first rate during provision of said second signal and discharges at a second rate after termination of said second signal.

15. The control circuitry of claim 14, wherein said second rate is substantially slower than said first rate.

16. The control circuitry of claim 11, wherein said control signal is a ramp voltage signal and said reference signal has an exponential waveform.

17. The control circuitry of claim 18, wherein said reference signal generating means comprises a capacitor whose charge varies to provide said reference signal.

18. The control circuitry of claim 17, wherein said capacitor charges at a first rate during provision of said second signal and discharges at a second rate after termination of said second signal.

19. The control circuitry of claim 18, wherein said second rate is substantially slower than said first rate.

20. In an X-ray system having an X-ray tube with a rotatable anode, an alternating-current motor for rotating the anode, and X-ray tube control means for energizing the X-ray tube, control circuitry comprising:
   (a) voltage gate means comprising at least one silicon controlled rectifier for selectively applying voltage to said alternating-current motor thus regulating the amount of power delivered thereto;
   (b) motor operation indicating means responsive to current through said motor for providing coincidentally a first signal to said X-ray tube control means enabling said control means to energize said tube and a second signal;

(c) generator means for producing a linear ramp voltage signal having a cyclically varying amplitude;

(d) reference signal generating means for receiving said second signal and generating a reference signal having a time-varying amplitude in response thereto; and (e) comparator means for receiving said ramp voltage signal and said reference signal, comparing their amplitudes, and providing a gating signal to said voltage gate means to apply voltage to said motor whenever the amplitude of said ramp voltage exceeds the amplitude of said reference signal.

21. The control circuitry of claim 20, wherein said motor has two stator windings, and said motor operation indicating means is responsive only to simultaneous current through both said stator windings to provide said first and second signals.

22. The control circuitry of claim 21, wherein said motor operation indicating means comprises an AND gate, and time delay means for delaying provision of said first and second signals for a predetermined substantially constant time after initiation of current through said motor which enables said AND gate.

23. The control circuitry of claim 22, wherein said reference signal generating means comprises a capacitor whose charge varies to provide said reference signal.

24. The control circuitry of claim 23, wherein said capacitor charges at a first rate during provision of said second signal and discharges at a second rate after termination of said second signal.

25. The control circuitry of claim 24, wherein said second rate is substantially slower than said first rate.

References Cited

UNITED STATES PATENTS

| | | | |
|---|---|---|---|
| 3,043,957 | 7/1962 | Graves | 250—93 |
| 3,094,618 | 6/1963 | McLaughlin | 250—93 |
| 3,205,360 | 9/1965 | Graves | 250—93 |
| 3,244,884 | 4/1966 | McLaughlin | 259—93 |
| 3,335,280 | 8/1967 | Wright | 250—93 |
| 3,428,809 | 2/1969 | Daniels et al. | 250—102 |

RALPH G. NILSON, Primary Examiner

C. E. CHURCH, Assistant Examiner